United States Patent [19]

Tirabassi et al.

[11] 4,060,326
[45] Nov. 29, 1977

[54] OPTICAL INSTRUMENT FOR MEASURING CONCENTRATIONS OF POLLUTING GASES ON LONG AND SHORT GEOMETRICAL PATHS

[75] Inventors: Tiziano Tirabassi, Carpi; Giorgio Giovanelli, Bologna; Giulio Cesari, Bologna; Ubaldo Bonafe, Bologna; Ottavio Vittori Antisari, Bologna, all of Italy

[73] Assignee: Tecneco S.p.A., Fano (Pesaro), Italy

[21] Appl. No.: 592,727

[22] Filed: July 3, 1975

[30] Foreign Application Priority Data

July 4, 1974 Italy .................................. 3431/74

[51] Int. Cl.² .............................................. G01J 3/42
[52] U.S. Cl. ..................................................... 356/96
[58] Field of Search ............... 250/343, 237 R, 237 G; 356/74, 96, 97, 99, 100

[56] References Cited

U.S. PATENT DOCUMENTS

3,700,332  10/1972  Decker, Jr. ........................... 356/97

Primary Examiner—F. L. Evans
Attorney, Agent, or Firm—Morgan, Finnegan, Pine, Foley & Lee

[57] ABSTRACT

The present invention provides an optical instrument for measuring concentrations of polluting gases on long and short geometric paths. The apparatus comprises a telescope for focussing a ray of light into a spectrometer, a comparison cell containing a known concentration of a polluting gas, control means and an electronic apparatus adapted to determine the concentration of the polluting gas in the analytical sample.

9 Claims, 6 Drawing Figures

OPTICAL INSTRUMENT FOR MEASURING CONCENTRATIONS OF POLLUTING GASES ON LONG AND SHORT GEOMETRICAL PATHS

The present invention relates to an optical instrument for measuring concentrations of polluting gases on long and short geometrical paths, in particular for measuring optical paths (values of the gas means concentration by the geometrical distance between the light source and the measuring instrument) of polluting gases (e.g. $SO_2$, $NO_2$, $NH_3$, $HC_1$) in atmosphere on long (several kilometers) and short geometrical paths.

In the prior art there are optical instruments for measuring the concentration of polluting gases, acting within the field of the mask correlation spectrophotometry, comprising essentially an optical system for aligning the light coming from a source located at a predetermined distance, an element of spectral dispersion, a correlation mask and a photodetector. A determined spectral portion of the source is correlated with the mask having a relative cyclic motion.

The spectral shape of a light source is modified by the absorption due to the medium passed through by the light.

A gas modifies the source spectrum proportionally to the value of the absorption molecular cross section for each wave length and to the concentration of the absorbing molecules.

The product of the concentration of a given gas by the geometrical distance of the light source from the instrument is given by the lambert's law for parallel and monochromatic light beams $$N = N_o \exp(-\alpha C L)$$

where:

$N$ = irradiance of the source passed through by the gas $N_o$ = irradiance of the source as to a determined wave lenght $\alpha$ = absorption coefficient for the gas for the same wave lenght.

$C$ = mean concentration of the gas $L$ = geometrical path covered by the light beam Considering, e.g., the transmittance spectrogram of $SO_2$ within the spectral range 2950 - 3150 A (Amstrong), it shows a typical undulatory shape.

The instrument mask comprises a series of slits.

The slit spacing imitates the spacing of the absorption "bands" or "windows" of the gas, such as they are on the outlet focal plane of the spectrometer (within the range 2950 - 3150 A).

The mask is located on the outlet focal plane of the spectrophotometer and can oscillate at a constant frequency so that, in the mask occillation dead centers, the slits coincide on one hand with the "bands" and on the other hand with the "windows" (adjacent to the "bands") of the gas spectrum.

A sinusoidal signal is obtained at the photomultiplier outlet.

Considering the energy ratio $P_1/P_2$ where $P_1$ indicates the energy reaching the photomultiplier when the mask slits coincide with the gas absorption "windows" and $P_2$ indicates the energy when the mask slits coincide with the gas absorption "bands," and considering its mean values over the slit width it is possible to write:

$$R = \frac{P_1}{P_2} = K \frac{\sum_{1}^{n} N_{\lambda,i} \exp(-\alpha_{\lambda,i} \cdot CL)}{\sum_{1}^{n} N_{\lambda,j} \exp(-\alpha_{\lambda,j} \cdot CL)}$$

where:

$K$ = instrument constant (optical system, spectrometer factor, filters and so on)

$n$ = number of slits photoengraved on the mask $N\lambda, i$ = source spectral irradiance in the position of the i-th slit (mean value on the slit width)

$\alpha\lambda, i$ = gas absorption coefficient in the position of the i-th slit (mean value on the slit width)

$N\lambda,j$ = source spectral irradiance in the position of the j-the slit (mean value on the slit width)

$\alpha\lambda, j$ = gas absorption coefficient in the position of the j-th slit (mean value on the slit width)

Since it is supposed that, no matter the source spectral shape and the source intensity, the values $N\lambda$ and $\alpha\lambda$ are not modified during the measurement, said known instruments give a curve where the response $R$ of the instrument is only a function of the optical path $CL$ of the gas under examination ($SO_2$) and therefore of the gas concentration.

Such a curve, obtained in laboratory, is used for measuring unknown optical paths in atmosphere.

Such instruments, based on the mask correllation spectrophotometry in measuring gas concentrations in atmosphere, are not satisfactory since they do not allow the use of the response curve obtained in laboratory for measurements on long geometrical paths.

In such known instruments, the light energy reaching the instrument is supposed to be constant.

During measurements in atmosphere (on long geometrical paths) this is not the case, since the source spectral shape is modified by the radiation passing through the atmosphere (even if considered free from the gas under examination).

Neglecting the action of other possible gases polluting the atmosphere (whose effect is moderate), such a modification is mainly due by the scattering of light caused by the air molecules and particles, atmospheric dust, droplets and so on.

Accordingly, for large distances between source and instrument, the scattering modifies the value of the optical path $CL$ of the gas under examination and makes useless the instrument response curves previously obtained in laboratory.

This fact can be deduced theoretically too from the above cited equation which, taking into account to the interference phenomenon due to the atmospheric scattering, may be written as follows:

$$R = K \frac{\sum_{1}^{n} N_{\lambda,i} \exp(-\alpha_{\lambda,i} \cdot LC) \cdot \exp(-\beta_{\lambda,i} \cdot L)}{\sum_{1}^{n} N_{\lambda,j} \exp(-\alpha_{\lambda,j} \cdot LC) \exp(-\beta_{\lambda,j} \cdot L)}$$

where, furthermore, $\beta\lambda$ and $\alpha\mu,(i, j = 1,2 \ldots n)$ are extinction coefficients (mean values on the atmospheric scattering. $\beta\lambda,i$ correspond to mask slits coinciding with the $SO_2$ absorption "windows": and $\beta\lambda,j$ to mask slits coinciding with the $SO_2$ absorption "bands."

The dependence of the scattering function on $\lambda$ (extinction coefficient value in function of the spectral wave lengh) cannot be foreseen: the scattering in atmosphere is due both to molecules and to particles.

The cross section of the molecular scattering is proportional to $\lambda^{-4}$, the one due to particles to $\lambda^{-b}$ where b ranges from 1,3 to 1,9. This means the spectral shape of a source attenuates and modifies exponentially according to the distance and, accordingly, the measurements effected in atmosphere with a mask correlation spectrophotometer are functions not only of the optical path CL of the gas under examination ($SO_2$) but also of the extinction (or absorption) coefficients due to the atmosphere.

A dependence of the instrument response R on the atmospheric scattering is observed both in absence of polluting gas (CL = 0) and in presence of the gas under examination.

The curve of response R obtained in laboratory for calibrating the instrument, cannot be used, therefore, for accurate measurements in atmosphere.

Object of the present invention is an optical measuring device, based on the mask correlation spectrophotometry, by means of which it is possible to carry out precise measurements of polluting gas concentrations in atmosphere both for short and long (several kilometers) geometrical paths.

Further object of the invention is a great versatility in measurements for long geometrical paths, The scope of the invention is realized by a device comprising: a telescope focussing a light beam, coming froma source located at a predetermined distance, into the slit of a spectrometer; at least a cell, containing a known concentration of the polluting gas under examination, brought by suitable first control means along the path of the light beam between said telescope and said slit; said spectrometer dispersing and focussing said light beam on its own outlet focal plane; a mask provided with slits, moved by suitable means and located on the outlet focal plane of said spectrometer, said mask together with said means being suitable to effect the sampling of said dispersed light beam in at least four series of wave length ranges; a photodetector giving at the outlet electrical signals when receiving at the inlet light signals caused by said sampling; an electronic apparatus, located at the outlet of said photodetector, suitable to elaborate at least four numerical values, of which: a first numerical value relating to the ratio between two electrical signals referring respectively to the sampling of a first and a second of said series of wave length ranges of the dispersed light beam, a second numerical value referring to the ratio between two electrical signals referring respectively to the sampling of a third and fourth of said series of wave length ranges of the dispersed light beam, a third numerical value referring to the ratio between two electrical signals referring respectively to the sampling of said first and second series of wave length ranges ofthe dispersed light beam when said cell is interlocated along the light beam, and a fourth numerical value relating to the ratio between two electrical signals referring respectively to the sampling of said third and fourth series of wave length ranges of the dispersed light beam when said cell is interlocated along the path of the light beam; said elaboration of the numerical data being such to give at the outlet a numerical value given by the value of the known concentration of the polluting gas contained in said cell multiplied by the length of the cell and by a ratio having as numerator the difference between said first and second numerical values and as denominator the product of the distance between said source and the measuring device by the value obtained subtracting from the difference between said third and fourth numerical values the said difference between the first and second numerical values.

Further characteristics and advantages will be shown by the following detailed specification of a preferred but unrestrictive realisation of the considered measuring instrument shown by way of example in the enclosed drawings, wherein.

Figure 3:
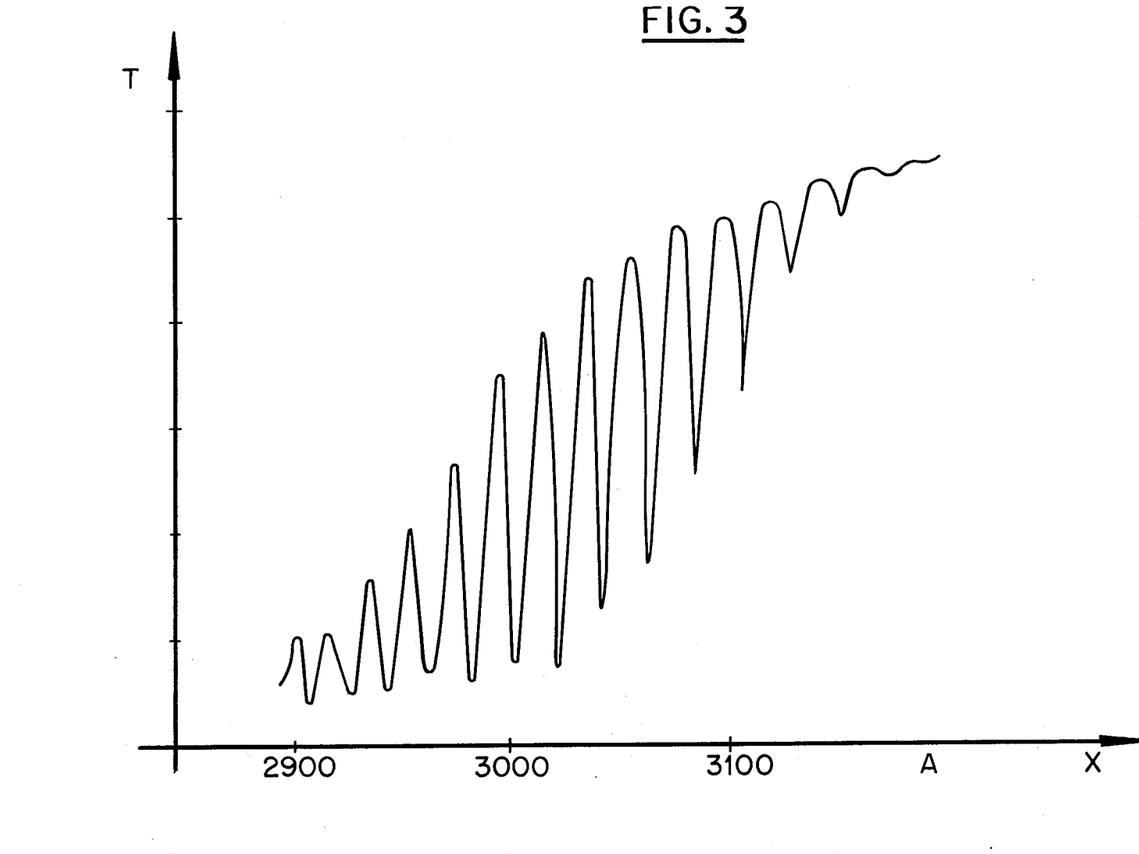
FIG. 3 shows diagrammatically an example of the transmittance spectrum of $SO_2$.
Figure 4A:
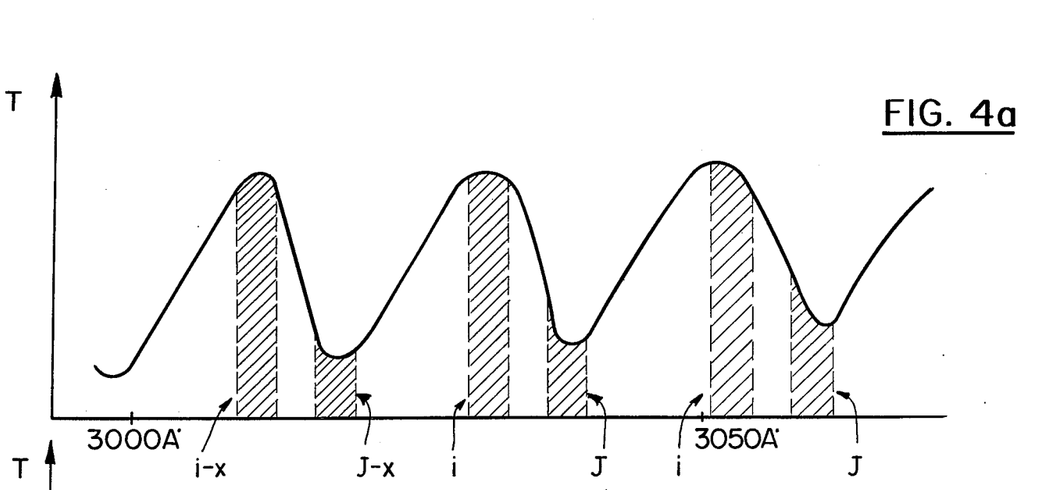
FIG. 4a and 4b show, diagrammatically, the transmittance spectrum of FIG. 3 in a different scale limited to a shorter wave length range.
Figure 4B:
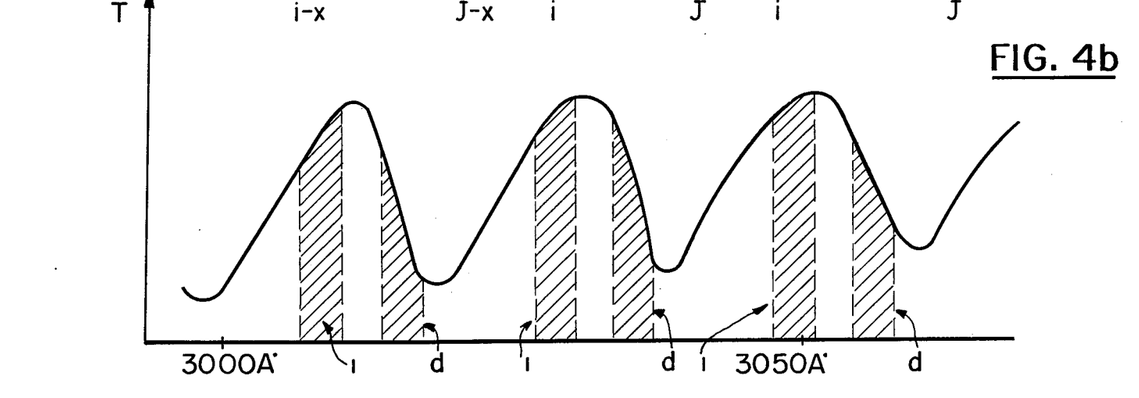

In the diagrams of FIGS. 3, 4a and 4b the ordinates relate to the transmittance values (T) and the abscissae to the wavelength values expressed in amstrong (A).

Figure 5:
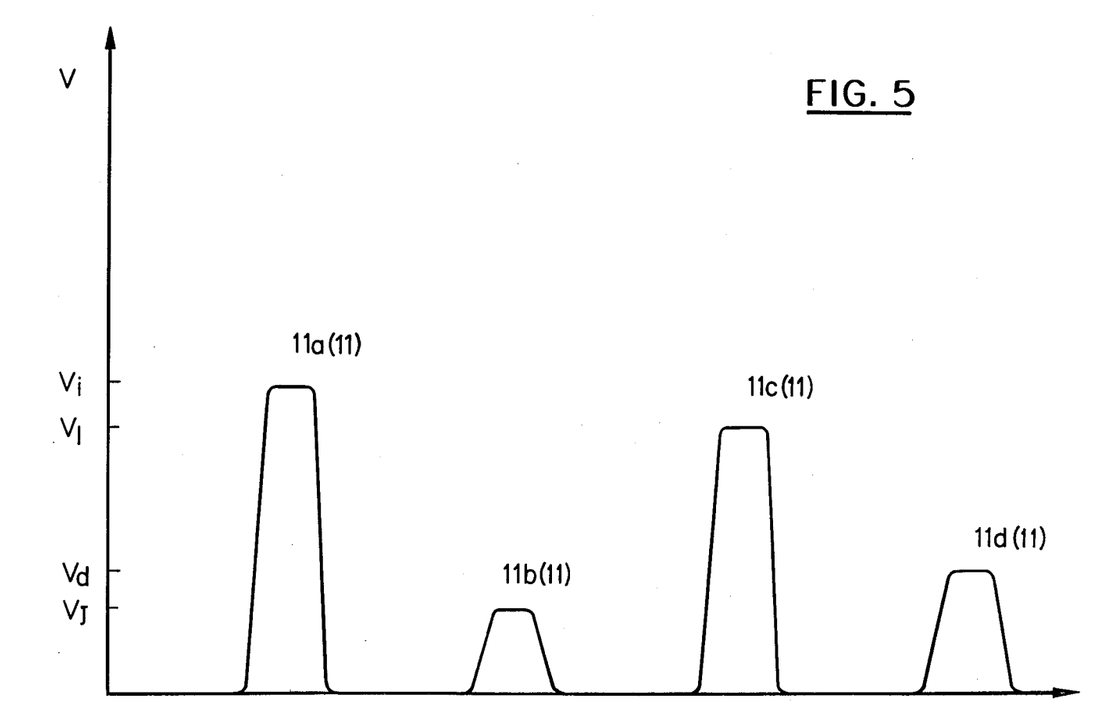
FIG. 5 shows diagrammatically an example of a complete sequence of signals at the outlet of the photodetector enclosed in the measuring instrument.

In the diagram of FIG. 5 the ordinates relate to the voltage values (V) and the abscissae to the values of time (t).

Figure 1:
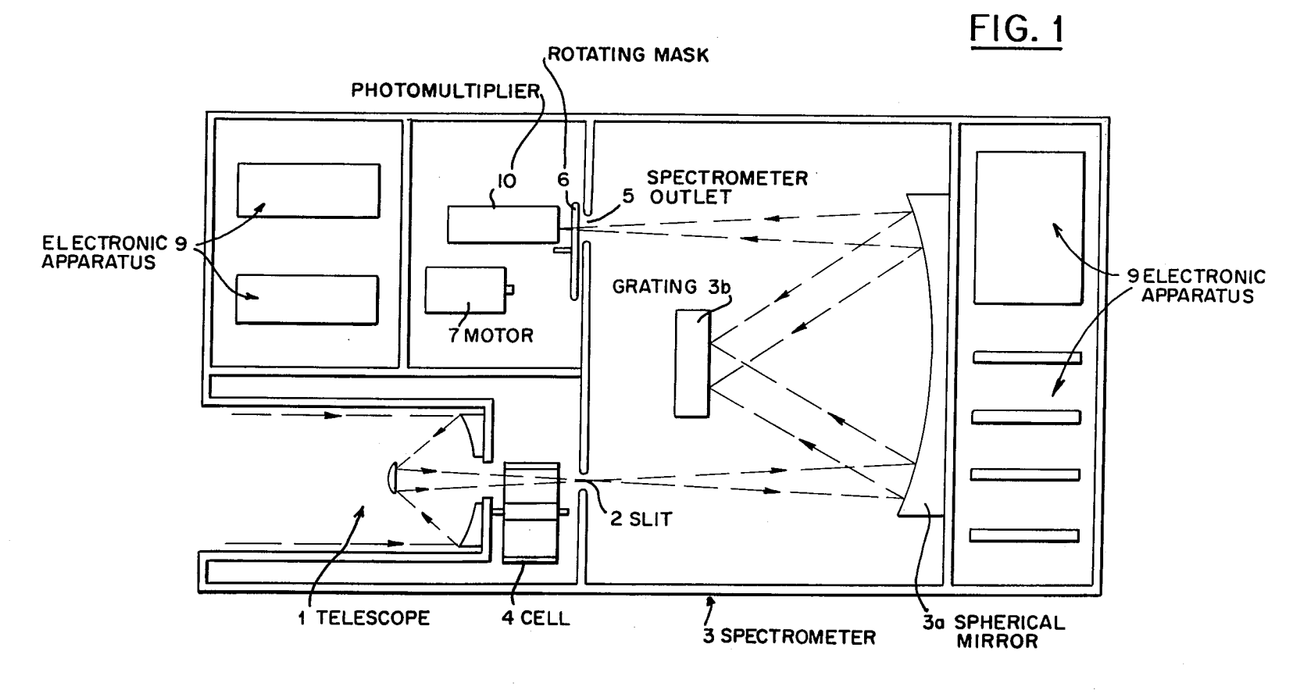
FIG. 1 shows a diagrammatic view of the measuring instrument according to the invention.

With reference to said figures, 1 indicates a telescope, in particular a Cassegrain telescope; said telescope focalizes a light beam coming from a light source consisting of, e.g., a quarz-iodine or xenon arc lamp in a slit 2 foreseen at the inlet of a spectrometer 3.

between the telescope 1 and the slit 2 there is a group of cells 4; each of said cells 4 contains a known concentration of the poluting gas whose concentration has to be measured in the atmosphere.

Said cells 4 may be introduced separately, by suitable means not shown in the figures, into the light beam coming from the telescope 1, in front of the slit 2.

The spectrometer 3 is a grating spectrometer, in particular a Fast-Ebert grating spectrometer.

The light beam coming from the slit 2, impinging a portion of the spherical mirror 3a, is reflected to a grating 3b; the grating 3b disperses (spectral dispersion) said beam and sends same to the spherical mirror 3a which reflects the dispersed beam focussing same on the outlet focal plane of the spectrometer 3, with wich the spectrometer outlet 5 is aligned.

The mirror 3a and the grating 3b are integral parts of the spectrometer 3.

Figure 2:
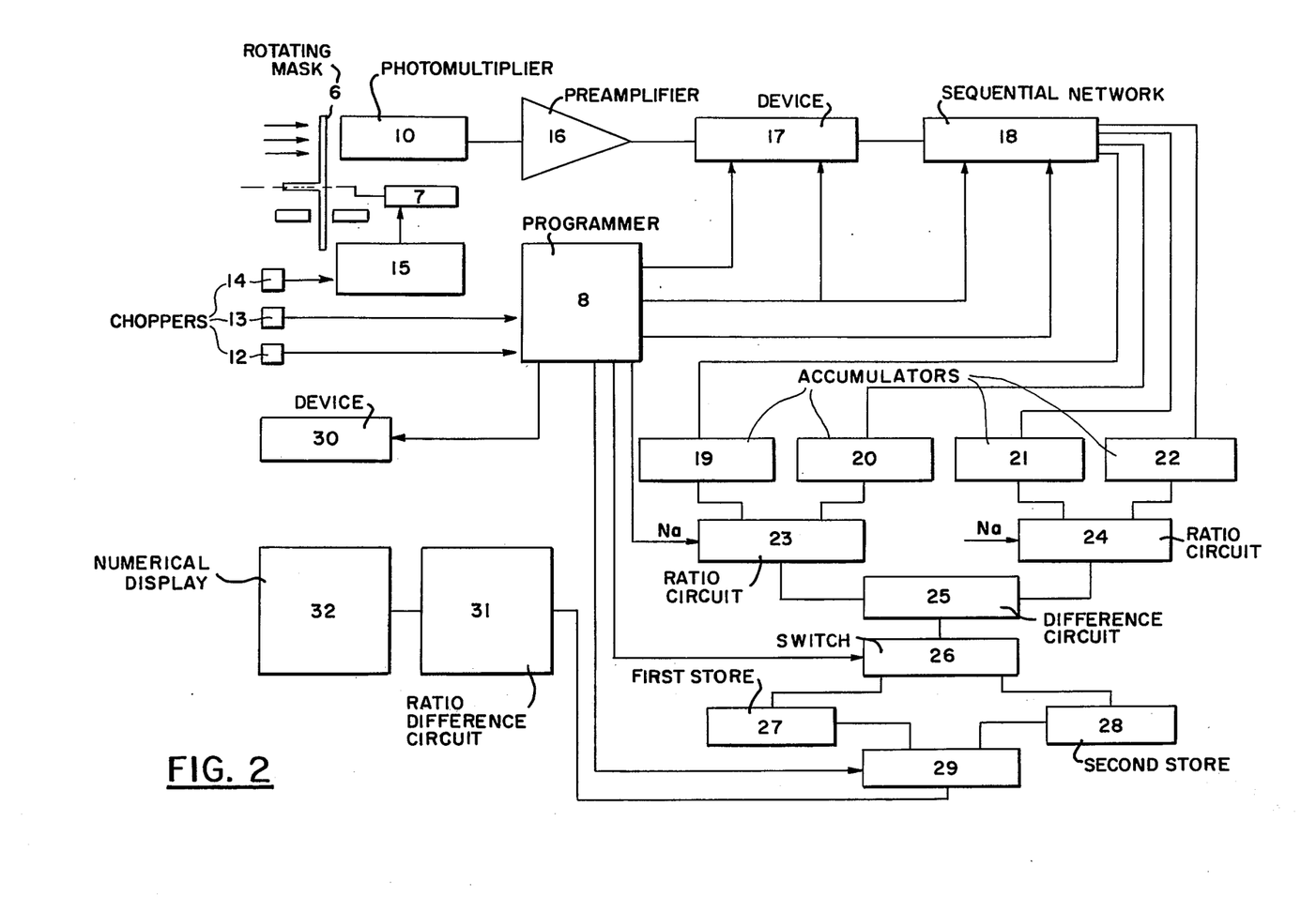
FIG. 2 shows a detailed block diagram of the electronic apparatuses enclosed in the measuring instrument.

On said outlet focal plane of the spectrometer there is a rotating mask 6, driven in rotation by suitable second means, in particular by a motor 7 whose speed is controlled by an electronic apparatus 9 shown in detail in FIG. 2 and to be further specified.

Said rotating mask 6 comprises a quarz disk with a non-transparent surface as to the radiation; the disk presents four series of slits photo-engraved, consisting of portions of concentric sections of toroid located sectorwise and suitable to effect a sampling on four distinct series of wave length ranges of the dispersed light beam.

Said four series of slits are alike (same length of the corresponding slits, same distance between two following slits of each series, same number of slits); said series differ only for the distance they present as to the disk axis and therefore for the different position in which said sampling is effected during the rotation of the mask, in different moments, as to the positions of the "bands" and "windows" of the absorption spectrum of the gas under examination projected onto the outlet focal plane of the spectrometer.

The position of the slits each other and as regards to the disk axis is a function of the polluting gas under examination.

If the gas under examination is, e.g., $SO_2$ the transmission spectrum under examination is limited within the wave length range from 2900 to 3150 A (See FIG. 3).

In this case the position of the four slit series is inferable also by means of FIGS. 4a and 4b, where for each slit series only three following slits have been drawn.

In fact, naming i, j, l and d the four slit series, the slit series "i" (see FIG. 4a) coincides with the absorption "windows" of $SO_2$ and the slit series "j" coincides with the absorption "bands" of $SO_2$.

Slit series "1" (see FIG. 4b) is shifted of a certain amount towards the ultraviolet, in particular 2,4 A as regards to series "j".

The rotating mask apparatus may translate parallel to said focal plane of the spectrometer and allows a correct centering of the four slit series as regards to the position of the "bands" and "windows" of the absorption spectrum of the polluting gas, such as appearing on the outlet focal plane of the spectrometer 3.

A photomultiplier 10, located backside the rotating mask 6, receives the dispersed light beam, passing through said slit series effecting the sampling of said beam, and transforms the latter into electrical signals 11 (see FIG. 5) having a similar duration since the mask rotates at a constant velocity.

Since there are four slit series, at the outlet of the photomultiplier 10 there will be a cyclic sequence of four electrical signals 11a, 11b, 11c and 11d recurring at the same rotation frequency of the mask 6.

Each of said electrical signals relates to a sampling carried out by the corresponding series of slits in a series of wave length ranges of the dispersed light beam.

The electrical signal 11a, having an amplitude $V_i$, is obtained when the slit series "i", passing in front of the outlet focal plane of the spectrometer 3, "sees" the "windows" of the absorption spectrum of the polluting gas, in particular $SO_2$.

The electrical signal 11b, of amplitude $V_j$, is obtained, in a similar way, when the slit series "j" sees the "bands" of said absorption spectrum.

The electrical signal 11c, of amplitude $V_1$ lower than $V_j$, is obtained when the slit series "1" sees the spectral ranges shifted of a certain amount towards the ultraviolet as regards to the position of the gas absorption "windows."

The electrical signal 11d, of amplitude $V_d$ higher than $V_j$, is obtained when the slit series "d" "sees" the spectal ranges shifted of the same amount towards the ultraviolet as regards to the gas absorption "bands."

The chromium plated quarz disk, constituting the mask, presents, in positions different from the sectors relating to said four slit series, holes obtained, like the slits, by a photoengraving process, said holes being likewise detected by three optical choppers 12, 13 and 14.

The first chopper 12 gives a first optical signal $V_c$ to a programmer 8; said signal $v_c$ is the sequence starting signal in the order 11a, 11b, 11c and 11d.

The second chopper 13 gives a second and third electric signal $V_I$ and $V_F$ which are sent to the programmer 8; said second and third signals $V_I$ and $V_F$ are, respectively, the start and end signals of the duration of the four electrical signals 11a, 11b, 11c and 11d at the outlet of the photomultiplier 10.

Said chopper 14 gives a number of electrical signals (e.g. four for each rotation of the disk), which are sent to a device 15 for regulating the speed of the motor 7 which rotates said disk constituting the correlation mask 6.

Element 16 is a preamplifier located at the outlet of the photomultiplier 10; the outlet electrical signals of the preamplifier are sent to a device 17 comprising an analogic gate switched on by said second electrical signal $V_1$ and switched off by said third electrical signal $V_F$, and connected with a digital analogic converter converting the amplitude of said electrical signals 11a, 11b, 11c and 11d, amplified by said preamplifier 11, into corresponding trains of pulses expressed in binary code.

Said analogic converter is connected with a sequential network 18 for addressing data.

The sequential network 18 presents four outlets connected respectively with as many digital accumulators 19, 20, 21 and 22.

Said first electronic, sequence starting signal $V_c$, sent to said sequential network 18 of the programmer 8, controls the discharge order of said sequential network 18 so that the pulse trains relating respectively to the amplified electrical signals 11a, 11b, 11c and 11d reach the digital accumulators 19, 20, 21 and 22. The number of sequences, indicated by $N_a$, to be accumulated is established in multiples of $V_c$ (e.g. $N_a = 10\ V_c$, $100\ V_c$ and so on) to be preselected through said programmer.

When the sequence number coincides with the programmed $N_a$, the accumulators 19 and 20 discharge the accumulated data into a first ratio circuit 23 and the accumulators 21 and 22 discharge the accumulated data into a second ratio circuit 24. A first numerical value is requested equal to the ratio between the amplitudes of the electrical signal 11a and the electrical signal 11b; said electrical signals have been both amplified by the preamplifier 16 and transformed into corresponding pulse trains expressed in binary code by said digital analogic converter.

The ratio circuit 23 gives said first value which, however, relates to an average of $N_a$ sequences: said value is indicated by R'.

Similar considerations are applied to the second ratio circuit 24 giving a second numerical value R" equal to the ratio between the amplitudes of the signals 11c and 11d, relating to an average of $N_a$ sequences. Said values R' and R" are fed to a difference circuit 25 effecting a first difference R' − R"); said difference, through a switch 26 controlled by the programmer 8, is fed to a first store 27.

The operation of the optical measuring instrument according to the invention will be now specified with reference to the determination of the $SO_2$ concentration in a polluted environment.

Fix the light source, e.g. a quarz-iodine lamp or a xenon arc lamp, at a predetermined distance from the optical measuring instrument according to the invention, the mask 6 is centered in such a way the slit series "i" sees the "windows" and the slit series "j" sees the "bands"; said centering is realized when the signal 11a of amplitude $V_i$ reaches the highest value.

Said four slit series "i", "j", "l" and "d" effect a sampling in four corresponding series of wave length ranges of the dispersed light beam.

After centering the mask 6 and prefixing a determined number of sequences to be accumulated $N_a$ through the programmer 8, a first measurement is effected whose value, equal to said first difference ($R' - R''$) expressed in binary code, is fed to the first store 27.

Said first measurement is effected without setting the cell 4 between the telescope 1 and the slit 2; in this way the light beam coming from the light source passes only through the polluted environment to be examined. Once said preselected number $N_a$ of sequences is ended, the programmer 8 orders the device 30 to locate the cell 4, having a length $L_1$ and containing a known concentration $C_1$ of $SO_2$, between the light beam coming from the telescope 1 and the slit 2 of the spectrometer 3.

Likewise a second measurement is carried out where, in a similar way, the first ratio circuit 23 gives a third value $\bar{R}'$ different from $R'$, since obtained when the cell 4 is located between the telescope 1 and the slit 2 of the spectrometer 3, and the second ratio circuit 24 gives a fourth value $\bar{R}''$ different from $R''$, since obtained when the cell 4 is interposed: said third and fourth values $\bar{R}'$ and $\bar{R}''$ are fed to the difference circuit 25 carrying out a second difference $\bar{R}' - \bar{R}''$.

The value $\bar{R}' - \bar{R}''$ of said second measurement is fed, through the switch 26 controlled by the programmer 8, to a second store 28.

The first store 27 and the second store 28 are connected with a ratio-difference circuit 31, to which they fee the stored data by means of a store discharger 29 controlled at its turn by the programmer 8.

Said ratio-difference circuit 31 gives the value $$\frac{(R' - R'')}{(\bar{R}' - \bar{R}'') - (R' - R'')}$$

The above value, given by the ratio-difference circuit 31, multiplied by $C_1L_1$ gives the unknown optical path of $SO_2$ and, accordingly, the concentration C of the polluting gas is:

$$C = \frac{C_1L_1}{L} \cdot \left[ \frac{(R' - R'')}{(\bar{R}' - \bar{R}'') - (R' - R'')} \right]$$

Said ratio-difference circuit 31 is such as to take into account said term $C_1L_1/L$ insertable at will, and therefore at the outlet of said ratio-difference circuit there is the required value of the concentration C of the polluting gas (mean concentration over the whole path L); said value, expressed in BCD code and converted into a suitable code, is visualized on a numerical display 32.

Both theoretical and experimental considerations show that the above written relationship gives indeed the value of the unknown concentration of a polluting gas, in particular $SO_2$.

In fact, as above indicated, the first ratio circuit 23 gives the value:

$$R' = \frac{V_i}{V_j}$$

where $V_i$ and $V_j$ are the amplitudes of the electrical signals 11a and 11b respectively.

Likewise the second ratio circuit 24 gives the value:

$$R'' = \frac{V_l}{V_d}$$

where $V_l$ and $V_d$ are the amplitudes of the electrical signals 11c and 11d.

On the other band is clear that:

$$R' = \frac{V_i}{V_j} = \frac{P_1}{P_2}$$

where $V_i$ and $V_j$ are amplitudes, as already said, of the electrical signals 11a and 11b respectively; $P_1$ and $P_2$ are, on the contrary, the mean light energies impringing on the photocathode of the said photomultiplier and relating to the energies of the light signals passing, respectively, through the slit series "i" and "j" of the mask 6 which is rotated uniformly.

The known equations give on the other hand:

$$R' = \frac{P_1}{P_2} = K \frac{\sum_{1}^{n} N_{\lambda,i} \exp(-\alpha_{\lambda,i} CL) \cdot \exp(-\beta_{\lambda,i} \cdot L)}{\sum_{1}^{n} N_{\lambda,j} \exp(-\alpha_{\lambda,j} CL) \exp(-\beta_{\lambda,j} L)}$$

where K indicates a constant taking into account the telescope 1 and the spectrometer 3; n indicates the number of the slits photoengraved on the correlation mask 6; $N\lambda,i$ indicates the mean value, on the i-th slit width, of the spectral irradiance of the source in the position of the same i-th slit; $\alpha\lambda$, i indicates the absorption coefficient of the gas ($SO_2$) in the position of the i-th slit; $\beta\lambda$,i is the mean value of the extinction coefficient on the i-th slit width due to the atmospheric scattering; $N\lambda,j, \alpha\lambda$, i and $\beta\lambda,j$ are, respectively, the mean values relating to the j-th slit of the source spectral irradiance, of the gas absorption coefficient and of the extinction coefficient due to the scattering; C is the unknown concentration of the polluting gas; L is the distance between the light source and the optical measuring instrument according to the invention. Likewise $$R'' = \frac{V_l}{V_d} = \frac{P_3}{P_4}$$

where $V_l$ and $V_d$ are the amplitudes, respectively, of the electrical signals 11c and 11d at the outlet of the photomultiplier 10; $P_3$ and $P_4$ are the mean light energies impinging onto the photocathode of said photomultiplier and relating to the energies of the light signals passing, respectively, through the slit series "l" and "d" of said mask 6. Likewise, the known equations give:

$$R'' = K \frac{\sum_{1}^{n} N_{\lambda,l} \exp(-\alpha_{\lambda,l} CL) \cdot \exp(-\beta_{\lambda,l} \cdot L)}{\sum_{1}^{n} N_{\lambda,d} \exp(-\alpha_{\lambda,d} CL) \exp(-\beta_{\lambda,d} L)}$$

$N\lambda, \alpha\lambda$ and $\beta\lambda$ of this equation have the above meaning, but all the values are taken on the series of slits "l" and "d" in position shifted (2, 4 A for $SO_2$) as regards to the values corresponding to the relationship giving $R'$.

Since, whatever the series of values $\beta\lambda$, i, $\beta\lambda$, j $\beta\lambda$, 1 and $\beta\lambda$, d, the values $R'$ and $R''$ (which are the responses of the optical measuring instrument according to the invention) may be considered linear functions, within certain ranges, of the optical paths of the gas under examinations, a first approximation gives:

$$R' = R'_o + \frac{\Delta R'}{\Delta (CL)} \cdot CL$$

$$R'' = R''_o + \frac{\Delta R''}{\Delta (CL)} \cdot CL$$

where $R'_o$ and $R''_o$ are the responses of the optical measuring instrument for zero concentrations of the gas under examination on the same distance L between source and optical measuring instrument, i.e. $CL = 0$.

Theoretically and experimentally it is possible to assert that, whatever the atmospheric conditions, $R'_o = R''_o$. It results therefore:

$$(R' - R'') = \frac{CL}{\Delta (CL)} (\Delta R' - \Delta R'') = \frac{CL \cdot \Delta R}{\Delta (CL)}$$

and therefore $$C = \frac{\Delta (CL) \cdot (R' - R'')}{L \cdot (\Delta R' - \Delta R'')}$$

$\Delta$ (CL) is given, as mentioned, by the cell 4, in particular $\Delta$ (CL) = C L; $\Delta$ R' is given by (R'—R') and $\Delta$ R" is given by (R"—R") and accordingly it results $$C = \frac{C_1 L_1}{L} \cdot \frac{(R' - R'')}{(\overline{R}' - \overline{R}'') - (R' - R'')}$$

this being indeed the value given by the instrument in question.

In a second form of realisation of the optical measuring instrument in question, the mask 6 consists of a chromium plated quarz slab having a series of slits; the slit spacing imitates the spacing of the gas absorption "bands" (or "windows"), in the way said "bands" (or "windows") appear on the outlet focal plane of the spectrometer 3.

The so formed mask, located on said outlet focal plane of the spectrometer 3, is allowed to oscillate, through said second means, at a constant frequency so that at the two mask oscillation ends the slits of the mask coincide, at one end, with the "bands" and, at the other end, with the "windows" (adjacent to the preceding "bands") of the gas absorption spectrum.

At the outlet of the photomultiplier 10 there is a signal whose amplitude has an almost sinusoidal shape: the highest and lowest values of said signal occur when the mask sees the gas absorption "windows" and "bands" respectively.

With an electronic apparatus 9, different from the preceding one since the signal at the outlet of the photomultiplier 10 has a comparatively low frequency due to the low oscillation frequency of the mask, it is possible to store on a suitable store or to record on paper the first numerical value R' having the above meaning.

Introducing the cell 4 having a known concentration of polluting gas, e.g. $SO_2$, between the telescope 1 and the slit 2 of the spectrometer 3, the electronic apparatus gives the third numerical value $\overline{R}'$ having the above meaning.

Stopped the oscillations of the mask 6 by means of the said second means it is possible to displace the mask along the outlet focal plane of the spectrometer 3, in such a way the slits at the two mask oscillation ends see ranges of the gas absorption spectrum shifted of 2, 4 A (case of $SO_2$) towards the ultraviolet as to the position of the "windows," and ranges of the gas absorption spectrum shifted of 1, 4 A towards the ultra violet as to the position of the bands.

Always with the cell 4 located between the telescope 1 and the slit 2 of the spectrometer 3, it is obtained the fourth numerical value $\overline{R}''$ having the preceding meaning.

Removing the cell 4 from the path covered by the light beam from the telescope 1 to the slit 2, it is obtained the second numerical value R" having the above meaning.

Said four values R' R" $\overline{R}'$ and $\overline{R}''$ are elaborated by said electronic apparatus so as to obtain the value:

$$C = \frac{C_1 L_1}{L} \left[ \frac{R' - R''}{(\overline{R}' - \overline{R}'') - (R' - R'')} \right]$$

The optical measuring instrument in question complies with the purposes the invention aimes to.

In fact the unknown concentration of the polluting gas is measured exactly since the instrument is indifferent to the source nature, to the atmospheric scattering and hence to the distance between source and optical measuring instrument.

Further, said optical measuring instrument is very versatile since, besides the determination of the $SO_2$ concentration of further polluting gases, e.g. $NO_2$, $NH_3$, $I_2$ and so on.

Clearly, what above said by way of unrestrictive example may be varied, modified or combined without departing from the scope and field of the present invention as claimed hereinafter.

What is claimed is:

1. An optical instrument for measuring concentrations of polluting gases on long and short geometrical paths, characterized in that it comprises a spectrometer; a telescope focussing a light beam coming from a source located at a predetermined distance, into a slit of said spectrometer; at least a cell, containing a known concentration of the polluting gas under examination, brought by first control means along the path of the light beam between said telescope and said slit; said spectrometer dispersing and focussing said light beam on its own outlet focal plane; a mask provided with movable slits, moved by second control means and located on the outlet focal plane of said spectrometer, said mask provided with movable slits that are adapted to effect the sampling of said dispersed light beam in at least four series of wave length ranges; a photodetector giving at the outlet electrical signals when receiving at the inlet light signals caused by said sampling; an electronic apparatus, located at the outlet of said photodetector, including means to elaborate at least four numerical values, of which: a first numerical value relating to the ratio between two electrical signals referring respectively to the sampling of a first and second of said series of wave length ranges of the dispersed light beam, a second numerical value referring to the ratio between two electrical signals referring respectively to the sampling of a third and fourth of said series of wave length ranges of the dispersed light beam, a third numerical value referring to the ratio between two electrical signals referring respectively to the sampling of said first and second series of wave length ranges of the dispersed light beam when said cell is interlocated along the light beam, and a fourth numerical value relating to the ratio between two electrical signals referring respectively to the sampling of said third and fourth series of wave length ranges of the dispersed light beam when said cell is interlocated along the path of the light beam; said elaboration of the numerical data being such to give at the outlet a numerical value given by the value of the known concentration of the polluting gas contained in said cell multiplied by the length of the cell and by a ratio having as numerator the difference between said first and second numerical value and as denominator the product of the distance between said source and the measuring device by the value obtained substracting from the difference between said third and fourth numerical value the said difference between the first and second numerical value.

2. An optical measuring instrument according to claim 1, characterized in that said first series of ranges where the sampling occurs, corresponds to wave length values relating to the windows of the gas absorption spectrum in question; said second series corresponds to wave length values relating to the bands; said third and fourth series correspond to the wavelength slightly shifted as to the windows and bands respectively.

3. An optical measuring instrument according to claim 1, characterized in that said mask is a disk, rotated at constant speed by said second control means, which presents four series of slits arranged on a circular arc, having like width and depth, where each series presents an equal number of slits and the slits are equally spaced from each other; said series being differently spaced as to the disk rotation axis and each slit series being suitable to effect the sampling in one of said series of wave length ranges.

4. An optical measuring instrument according to claim 1, characterized in that said mask consists of a small slab presenting a series of parallel slits suitable to effect the sampling in one whatever of said series of ranges, said small slab being operated, so as to effect a rectilinear reciprocal periodical motion, by said second means, which allow, further, to shift along the focal plane the said small slab motion.

5. An optical measuring instrument according to claim 1 characterized in that said electronic apparatus comprises: at least three optical choppers detecting corresponding slits provided in a mask, a first chopper being suitable to give a first electrical signal, a second chopper being suitable to give a second and a third electrical signals and finally a third chopper suitable to give a plurality of electrical signals controlling through a suitable programmer, the second control means; said programmer, at whose inlet there are said first, second and third electrical signals, being further suitable to act on said first means, a preamplifier, arranged at the outlet of said photodetector, which amplifies said electrical signal relating to said sampling of the dispersed light beam; gate arranged at the outlet of said preamplifier, said analogic gate being switched on by said second signal and switched off by said third signal, said second and third signals being fed by said programmer; a digital analogic converter which converts the electrical signal coming from said analogic gate, relating to said sampling, into corresponding pulse trains expressed in binary code; a sequential network for addressing data, arranged at the outlet of said digital converter, presenting four outlets connected with as many digital analogic accumulators, said sequential network being suitable, through said first signal sent by said programmer, to address to a first digital accumulator the pulse train corresponding to the amplified electrical signal relating to the sampling of said first series of wave length ranges of the dispersed light beam, to address to a second digital, accumulator the pulse train corresponding to the amplified electrical signal relating to the sampling of said second series of wave length ranges of the dispersed light beam, to address to a third digital accumulator the pulse train corresponding to the amplified electrical signal relating the sampling of said third series of wave length ranges of the dispersed light beam and to address to a fourth digital accumulator the pulse train corresponding to the amplified electrical signal relating to the sampling of said fourth series of wave length ranges of the dispersed light beam, said addressing recurring cyclically for a predetermined number of sequences established by said programmer; a first ratio circuit at whose inlet there are said first and second digital analogic accumulators, suitable to give, through said programmer, a first numerical value and a third numerical value obtained with said cell arranged between said telescope and said spectrometer slit; a second ratio circuit at whose inlet there are said third and fourth digital analogic accumulators, suitable to give, through said programmer, said second numerical value and said fourth numerical value obtained with said cell arranged between said telescope and said spectrometer slit; a difference circuit at whose inlet are connected said first and second ratio circuits, said difference circuit being suitable to give a first difference between said first and second numerical values and to give a second difference between the third and fourth numerical values; a switch arranged at the outlet of said difference circuit, said switch being suitable, through an order of said programmer, to feed to a first store, and a second store said first and second differences, respectively a store discharger at whose inlet there are said first and second stores, said store discharger being suitable to send, through an order of the programmer, said first difference and said second difference stored into the corresponding stores to a ratio-difference circuit said ratio-difference circuit being suitable to give at the outlet a value equal to a fraction whose numerator is said first difference and denominator is the difference between said second difference and first difference, said ratio-difference circuit being further suitable to multiply the preceding ratio by a ratio presenting at the numerator the product of the known concentration of the cell by its length and at the denominator the distance between the source and the measuring instrument in question, obtaining thereby accordingly a value equal to the concentration of the polluting gas expressed in a suitable binary code; a numerical display connected at the outlet with said ratio-difference circuit, said numerical display being suitable to visualize the above said value of concentration, expressed in binary code, into the corresponding numerical value.

6. An optical measuring instrument according to claim 1, characterized in that said photodetector is a photomultiplier.

7. An optical measuring instrument according to claim 1, characterized in that said telescope is a Cassegrain telescope.

8. An optical measuring instrument according to claim 1, characterized in that the spectrometer is a grating spectrometer.

9. An optical instrument for measuring concentrations of polluting gases on long and short geometrical paths, characterized in that it comprises: a grating spectrometer, a telescope focussing a light beam coming from a source located at a predetermined distance, into a slit of said grating spectrometer; at least a cell containing a known concentration of the polluting gas under examination, brought by first control means along the path of the light beam between said telescope and said slit; said grating spectrometer dispersing and focussing said light beam on its own outlet focal plane; a mask provided with movable slits that are adapted to effect the sampling of said dispersed light beam in at least four series of wave length ranges; said movable slits being moved by second control means and located on the outlet focal plane of said spectrometer, a photodetector giving at the outlet electrical signals when receiving at the inlet light signals caused by said sampling; an electronic apparatus comprising of at least three optical choppers detecting corresponding slits provided in said mask a first chopper suitable to give a first electrical signal, a second chopper being suitable to give a second and a third electrical signal and finally a third chopper suitable to give a plurality of electrical signals controlling, through a suitable programmer, the second control means; said programmer, at whose inlet there are said first, second and third electrical signals, being further suitable to act on said first means; a preamplifier, arranged at the outlet of said photodetector which amplifies said electrical signals relating to said sampling of the dispersed light beam; an analogic gate arranged at the outlet of said preamplifier, said analogic gate being switched on by said second signal and switched off by said third signal, said second and third signals being fed by said programmer; a digital analogic converter which converts the electrical signal coming from said analogic gate, relating to said sampling, into corresponding pulse trains expressed in binary code; a sequential network for addressing data, arranged at the outlet of said digital converter, presenting four outlets connected with as many digital analogic accumulators, said sequential network being suitable, through said first signal sent by said programmer, to address to a first digital acculumator the pulse train corresponding to the amplified electrical signal relating to the sampling of said first series of wave length ranges of the dispersed light beam, to address to a second digital accumulator the pulse train corresponding to the amplified electrical signal relating to the sampling of said second series of wave length ranges of the dispersed light beam, to address to a third digital accumulator the pulse train corresponding to the amplified electrical signal relating to the sampling of said third series of wave length ranges of the dispersed light beam and to address to a fourth digital accumulator the pulse train corresponding to the amplified electrical signal relating to the sampling of said fourth series of wave length ranges of the dispersed light beam, said addressing recurring cyclically for a predetermined number of sequences established by said programmer; a first ratio circuit at whose inlet there are said first and second digital analogic accumulators, suitable to give, through said programmer, a first numerical value and a third numerical value obtained with said cell arranged between said telescope and said spectrometer slit; a second ratio circuit at whose inlet there are said third and fourth digital analogic accumulators, suitable to give, through said programmer, a second numerical value and a fourth numerical value obtained with said cell arranged between said telescope and said spectrometer slit; a difference circuit at whose inlet are connected said first and second ratio circuits, said difference circuit being suitable to give a first difference between said first and second numerical values and to give a second difference between the third and fourth numerical values; a switch arranged at the outlet of said difference circuit, said switch being suitable, through an order of said programmer, to feed to a first store and a second store said first difference; a store discharger at whose inlet there are said first and second stores, said store discharger being suitable to send, through an order of the programmer, said first and second differences stores into the corresponding stores to a ratio-difference circuit, said ratio-difference circuit being suitable to give at the outlet a value equal to a fraction whose numerator is said first difference and denominator is the difference between said second difference and first difference, said ratio-difference circuit being further suitable to multiply the preceding ratio by a ratio presenting at the numerator the product of the known concentration of the cell by its length and at the denominator the distance between the source and the measuring instrument in question, obtaining thereby accordingly a value equal to the concentration of the polluting gas expressed in a suitable binary code; a numerical display connected at the outlet with said ratio-difference circuit, said numerical display being suitable to visualize the above said value of the concentration, expressed in binary code, into the corresponding numerical value.

* * * * *